(12) United States Patent
Higashitsutsumi

(10) Patent No.: US 9,041,830 B2
(45) Date of Patent: May 26, 2015

(54) IMAGE SIGNAL PROCESSING CIRCUIT, IMAGE CAPTURE DEVICE, IMAGE SIGNAL PROCESSING METHOD, AND PROGRAM

(75) Inventor: Yoshihito Higashitsutsumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 13/578,319

(22) PCT Filed: Feb. 10, 2011

(86) PCT No.: PCT/JP2011/052804
§ 371 (c)(1),
(2), (4) Date: Aug. 10, 2012

(87) PCT Pub. No.: WO2011/102281
PCT Pub. Date: Aug. 25, 2011

(65) Prior Publication Data
US 2012/0307105 A1    Dec. 6, 2012

(30) Foreign Application Priority Data

Feb. 22, 2010    (JP) ................................. 2010-036329

(51) Int. Cl.
*H04N 9/73* (2006.01)
*H04N 1/409* (2006.01)
*H04N 9/04* (2006.01)

(52) U.S. Cl.
CPC ............... *H04N 1/4092* (2013.01); *H04N 9/04* (2013.01); *H04N 9/735* (2013.01)

(58) Field of Classification Search
CPC ..... H04N 9/045; H04N 1/4092; H04N 5/217; H04N 5/23229; H04N 19/00078; H04N 1/4072; H04N 1/58; H04N 1/6058; H04N 2209/046; H04N 5/142; H04N 5/23254; H04N 1/6005; G06T 5/003; G06T 2207/10024

USPC ................. 348/273, 254, 223.1, 207.99, 255; 382/255, 263, 275, 266, 270
See application file for complete search history.

(56) References Cited

U.S. PATENT DOCUMENTS

2009/0147111 A1*    6/2009    Litvinov et al. ............... 348/273

FOREIGN PATENT DOCUMENTS

| JP | 2008-042874 | 2/2008 |
| JP | 2008-516299 | 5/2008 |

(Continued)

OTHER PUBLICATIONS

International Search Report; International Application No. PCT/JP2011/052804; Mar. 22, 2011.

(Continued)

*Primary Examiner* — Twyler Haskins
*Assistant Examiner* — Padma Haliyur
(74) *Attorney, Agent, or Firm* — Fishman Stewart Yamaguchi PLLC

(57) ABSTRACT

The present invention relates to an image signal processing circuit, an image capture device, and image signal processing method, and a program capable of reading special information, such as a bar code, using normal lenses with high precision without needing dedicated EDOF lenses and signal processing circuits. The image signal processing circuit has a processing circuit 131 which performs image processing using one color signal (B) having resolution on a near point side from among a plurality of color signals, and an enhancement processing unit 132 which performs enhancement processing by applying an inverse function of a point spread function (PSF) to a signal subjected to the image processing using the one color signal by the processing circuit.

12 Claims, 11 Drawing Sheets

(56) References Cited

FOREIGN PATENT DOCUMENTS

| | | |
|---|---|---|
| JP | 2008-541316 | 11/2008 |
| JP | 2009-159536 | 7/2009 |

OTHER PUBLICATIONS

Chinese Office Action issued Mar. 4, 2014 for corresponding Chinese Application No. 201180009531.1.

* cited by examiner

QR CODE

FIG. 9

F:2.8 HFOV:54 Pix size:1.4um 3.2M pixel case

| Dot size mm/dot | Distance 10cm | 13cm | 15cm | 18cm | 20cm | 25cm |
|---|---|---|---|---|---|---|
| 0.2 | 88 lp/mm<br>0.25 Nq | 115<br>0.32 | 132<br>0.37 | 159<br>0.44 | 176<br>0.49 | 220<br>0.61 |
| 0.25 | 70<br>0.2 | 92<br>0.26 | 105<br>0.3 | 127<br>0.36 | 141<br>0.39 | 176<br>0.49 |
| 0.3 | 59<br>0.16 | 76<br>0.21 | 88<br>0.25 | 106<br>0.3 | 117<br>0.33 | 146<br>0.41 |
| 0.4 | 44<br>0.12 | 57<br>0.16 | 66<br>0.19 | 80<br>0.22 | 88<br>0.25 | 110<br>0.31 |

IMAGE SIGNAL PROCESSING CIRCUIT, IMAGE CAPTURE DEVICE, IMAGE SIGNAL PROCESSING METHOD, AND PROGRAM

TECHNICAL FIELD

The present invention relates to an image signal processing circuit, an image capture device, an image signal processing method, and a program which can be applied to, for example, a portable electronic apparatus provided with a solid-state image capture element such as a charge coupled device (CCD) or a complementary metal oxide semiconductor (CMOS) sensor.

BACKGROUND ART

In recent years, opportunities are increasing to read a two-dimensional bar code such as a quick response (QR) code, or special information such as calling card information, using a portable camera or the like.

In a general camera configuration in which resolution is high and the optical size is large, in order to acquire data of a QR code or the like, it is necessary to read a subject at a short distance of 10 cm to 20 cm. In this case, it is difficult to read the subject without using an AF lens.

Accordingly, at present, in order to bring a subject and a background into focus, there is an increasing demand for a camera provided with an extended depth of field (EDOF) lens and an EDOF image signal processing circuit.

A depth of field refers to the interval in focus within a range around a subject when a camera is focused on the subject.

SUMMARY OF THE INVENTION

Problems to be Solved by the Invention

However, in the above-described camera, in order to acquire a QR code or the like, an EDOF lens for a QR code and an EDOF image signal processing circuit are required, causing an increase in size of a circuit or high cost disadvantageously.

In the case of normal lens design, there is a problem in that chromatic aberration occurs.

An object of the invention is to provide an image signal processing circuit, an image capture device, an image signal processing method, and a program capable of reading special information, such as a bar code, using normal lenses with high precision without needing dedicated EDOF lenses and signal processing circuits.

Solutions to Problems

An image signal processing circuit according to a first aspect of the invention includes a processing circuit which performs image processing using one color signal having resolution on a near point side from among a plurality of color signals, and an enhancement processing unit which performs enhancement processing by applying an inverse function of a point spread function (PSF) to a signal subjected to image processing using one color signal by the processing circuit.

An image capture device according to a second aspect of the invention includes an image capture element, an optical system which guides incident light to the image capture element, and an image signal processing circuit which processes the output signal of the image capture element. The image signal processing circuit includes a processing circuit which performs image processing using one color signal having resolution on a near point side from among a plurality of color signals, and an enhancement processing unit which performs enhancement processing by applying an inverse function of a point spread function (PSF) to a signal subjected to image processing using one color signal by the processing circuit.

An image signal processing method according to a third aspect of the invention includes an image processing step of performing image processing using one color signal having resolution on a near point side from among a plurality of color signals, and an enhancement processing step of applying an inverse function of a point spread function (PSF) to a signal subjected to image processing using one color signal by the processing step to perform enhancement processing.

A program according to a fourth aspect of the invention causes a computer to execute image signal processing. The image signal processing has image processing which is performed using one color signal having resolution on a near point side from among a plurality of color signals, and enhancement processing which is performed by applying an inverse function of a point spread function (PSF) to a signal subjected to image processing using one color signal in the processing step.

Effects of the Invention

According to the invention, it is possible to read special information, such as a bar code, using normal lenses with high precision without needing dedicated EDOF lenses and signal processing circuits.

BRIEF DESCRIPTION OF DRAWINGS

FIG. 9 is a diagram collectively showing, in a table, subject distance-specific and waveform-specific MTF data extracted from a lens example and frequencies when 0.2 mm/dot, 0.25 mm/dot, 0.3 mm/dot, and 0.4 mm/dot.

MODE FOR CARRYING OUT THE INVENTION

Hereinafter, an embodiment of the invention will be described with reference to the drawings.

Description will be provided in the following sequence.
1. Configuration Example of Image Capture Device
2. First Embodiment (First Configuration Example of Image Signal Processing Circuit)
3. Second Embodiment (Second Configuration Example of Image Signal Processing Circuit)

Figure 1:
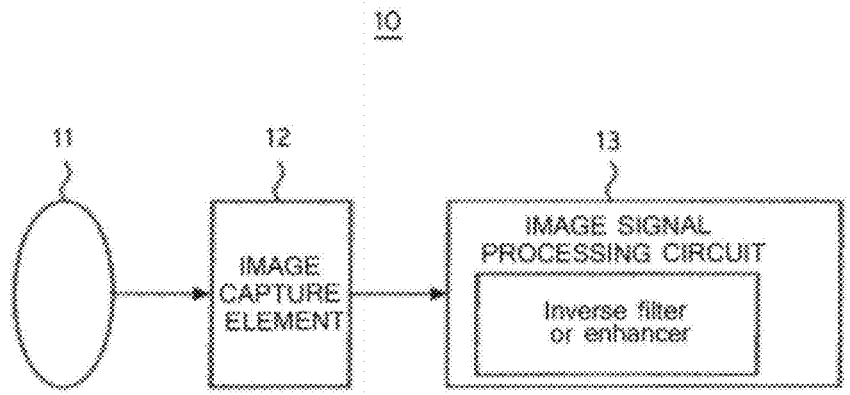
FIG. 1 is a block diagram showing a configuration example of a main part of an image capture device according to an embodiment of the invention.

FIG. 1 is a block diagram showing a configuration example of a main part of an image capture device according to an embodiment of the invention.

As shown in FIG. 1, an image capture device 10 has a lens system 11, an image capture element 12 which is constituted by, for example, a CMOS sensor, and an image signal processing circuit 13.

Figure 2:
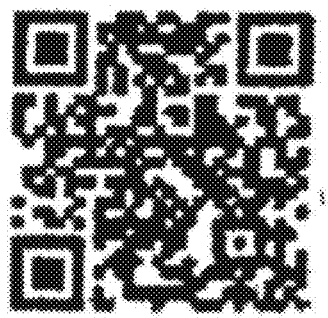
FIG. 2 is a diagram showing a QR code.

The image capture device 10 is configured to read a QR code shown in FIG. 2 or special information, such as a bar code, using normal lenses and EDOF lenses with high precision without needing dedicated EDOF lenses and EDOF signal processing circuits.

As described below in detail, the image capture device 10 is configured to read a bar code using normal lenses and EDOF lenses through processing using a blue (B) signal having resolution on a near point side and application of an inverse function of a point spread function (PSF).

The lens system 11 inputs a subject image of a QR code or the like to the image capture element 12.

For the lens system 11, for example, a lens in which resolution at a near point is B from among three primary colors of red (R), green (G), and blue (B) and aberration is high may be applied.

The image capture element 12 has, for example, sensor unit pixels arranged in an array with a predetermined arrangement form.

In the image capture element 12, a transfer selection line, a reset line, and a select line are wired in each row of the pixel arrangement, and a signal line is wired in each column of the pixel arrangement.

Figure 3:
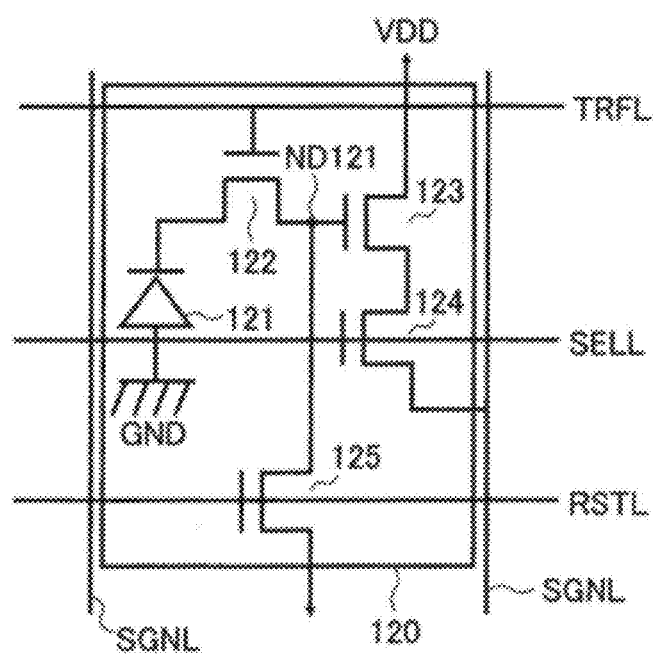
FIG. 3 is a circuit diagram showing an example of a unit pixel of this embodiment.

FIG. 3 is a circuit diagram showing an example of a unit pixel of this embodiment. FIG. 3 shows a CMOS sensor as an example.

A unit pixel 120 of FIG. 3 has a photodiode 121, a transfer transistor 122, an amplification transistor 123, a select transistor 124, a reset transistor 125, and a floating node ND 121.

The photodiode 121 photoelectrically converts incident light to signal charges (electrons) with the quantity of electric charge based on the quantity of incident light, and accumulates the signal charges.

The transfer transistor 112 is connected between the cathode of the photodiode 121 and the floating node ND121, and the gate thereof is connected to a transfer selection line TRFL. The transfer transistor 122 has a function of transferring the signal charges accumulated in the photodiode 121 to the floating node ND121 when electrical conduction is provided (turned on).

The amplification transistor 123 and the select transistor 124 are connected in series between a power supply potential VDD and a signal line SGNL.

The amplification transistor 123 has a gate connected to the floating node ND121, amplifies the potential on the floating node ND121, and outputs the amplified potential to the signal line SGNL through the select transistor 124.

The gate of the select transistor 124 is connected to a select line SELL.

The reset transistor 125 has a source connected to the floating node ND121, a drain connected to a predetermined potential line, and a gate connected to a reset line RSTL. The reset transistor 125 has a function of resetting the potential on the floating node ND121.

Figure 4:
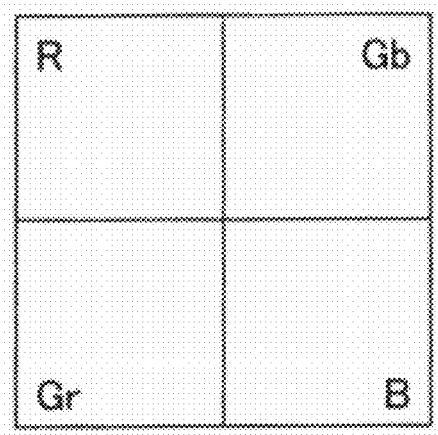
FIG. 4 is a diagram schematically showing an example of the pixel arrangement of a pixel array unit of a solid-state image capture element of this embodiment.

FIG. 4 is a diagram schematically showing an example of the pixel arrangement of a pixel array unit of this embodiment.

In this embodiment, as the arrangement of color filters of the image capture element, a Bayer arrangement in which two color filters for green (G) from among three primary colors having satisfactory color reproducibility, one color filter for red (R), and one color filter for blue (B) are used is applied.

The Bayer arrangement is an arrangement focusing on resolution of luminance rather than color.

Though not shown, a pre-processing unit maybe disposed in the output stage of the image capture element 12.

In this case, the pre-processing unit performs sampling and quantization on analog image information read from the image capture element 12, converts (A/D converts) an analog signal to a digital signal, and outputs the digital signal to the image signal processing circuit 13.

The function of the pre-processing unit maybe provided in the image capture element 12.

The image signal processing circuit 13 reproduces a QR code or the like using a normal lens system through processing using one signal from among input R, G, and B image signals, in this embodiment, a B signal having resolution on the near point side and application of an inverse function k of a PSF to the B signal.

<2. First Embodiment>
[First Configuration Example of Image Signal Processing Circuit]

Figure 5:
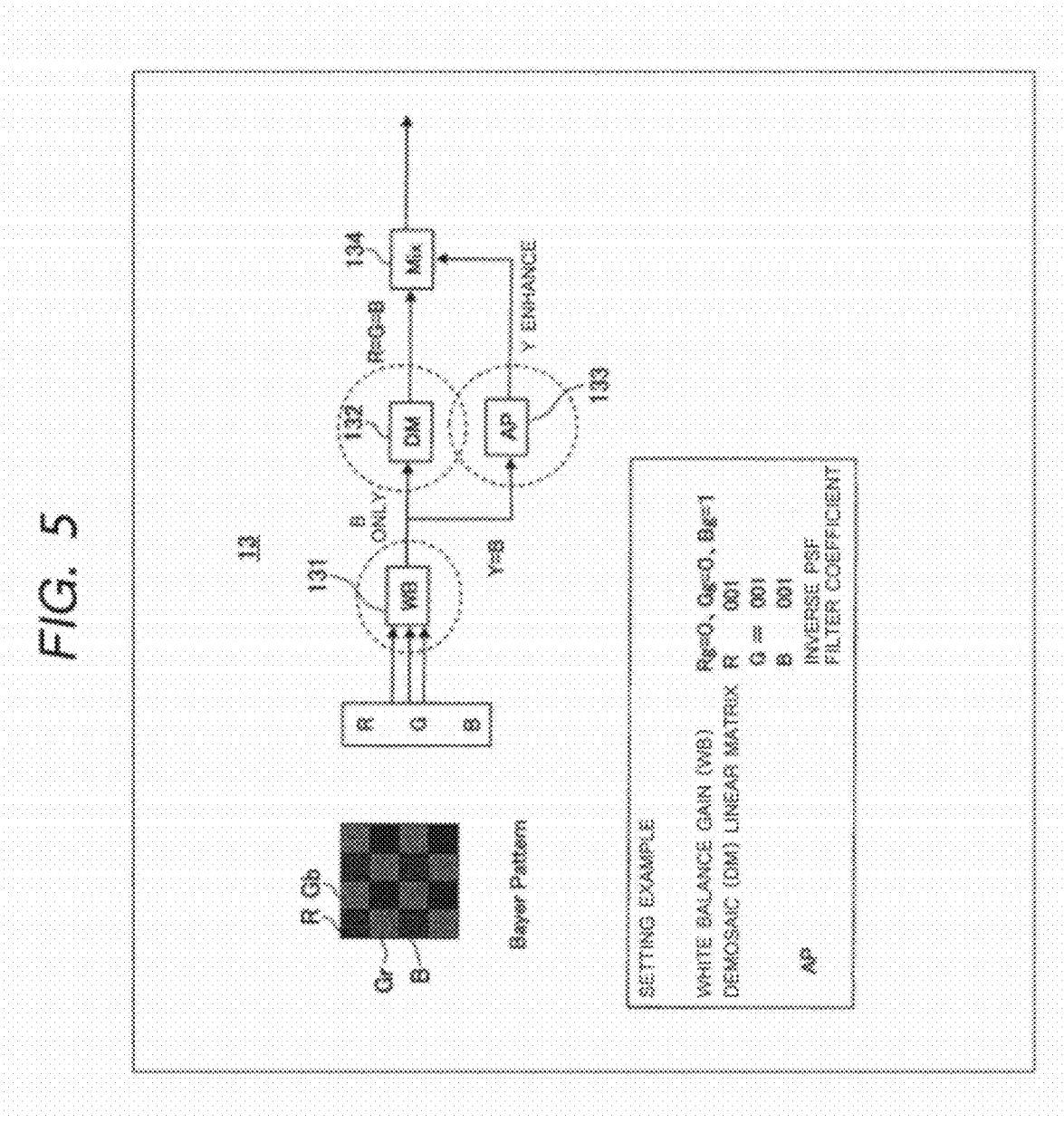
FIG. 5 is a block diagram showing a configuration example of an image signal processing circuit according to a first embodiment of the invention.

FIG. 5 is a block diagram showing a configuration example of an image signal processing circuit according to a first embodiment of the invention.

An image signal processing circuit 13 of FIG. 5 has a white balance (WB) processing circuit 131, a demosaic (DM) linear matrix circuit 132, an aperture control (AP) processing unit 133 serving as an enhancement processing unit, and a mixer 134.

The aperture control refers to processing in which a high-frequency component of an image is enhanced to enhance the contour. This processing is called aperture control.

The WB processing circuit 131 receives R, G, and B image signals, performs white balance processing using the B signal only with R=0, G=0, and B=1, and supplies the result to the DM linear matrix circuit 132.

The WB processing circuit 131 sets a signal output to the aperture control processing unit 133 as Y=B using a WB gain.

The DM linear matrix circuit 132 performs processing for linear conversion of color reproduction on the B signal subjected to white balance processing.

The DM linear matrix circuit 132 sets R=B and G=B using a linear matrix.

In this embodiment, R=001, G=001, and B=001 are set.

The aperture control processing unit 133 applies an inverse function k of a PSF, specifically, an inverse PSF filter coefficient Fk, to the B signal subjected to white balance processing, and outputs the result to the mixer 134.

The mixer 134 mixes a signal, to which an inverse PSF filter coefficient Fk is applied by the aperture control processing unit 133, in a signal processed by the DM linear matrix circuit 132.

In this case, an aperture control component of B only is mixed in the Y signal of B only.

As described above, in this embodiment, various kinds of processing are performed using a B signal component only by the image signal processing circuit 13, thereby reading special information, such as a bar code, using normal lenses with high precision without needing dedicated EDOF lenses and signal processing circuits.

Hereinafter, the reason for the use of the B signal or the like will be described.

Figure 6:
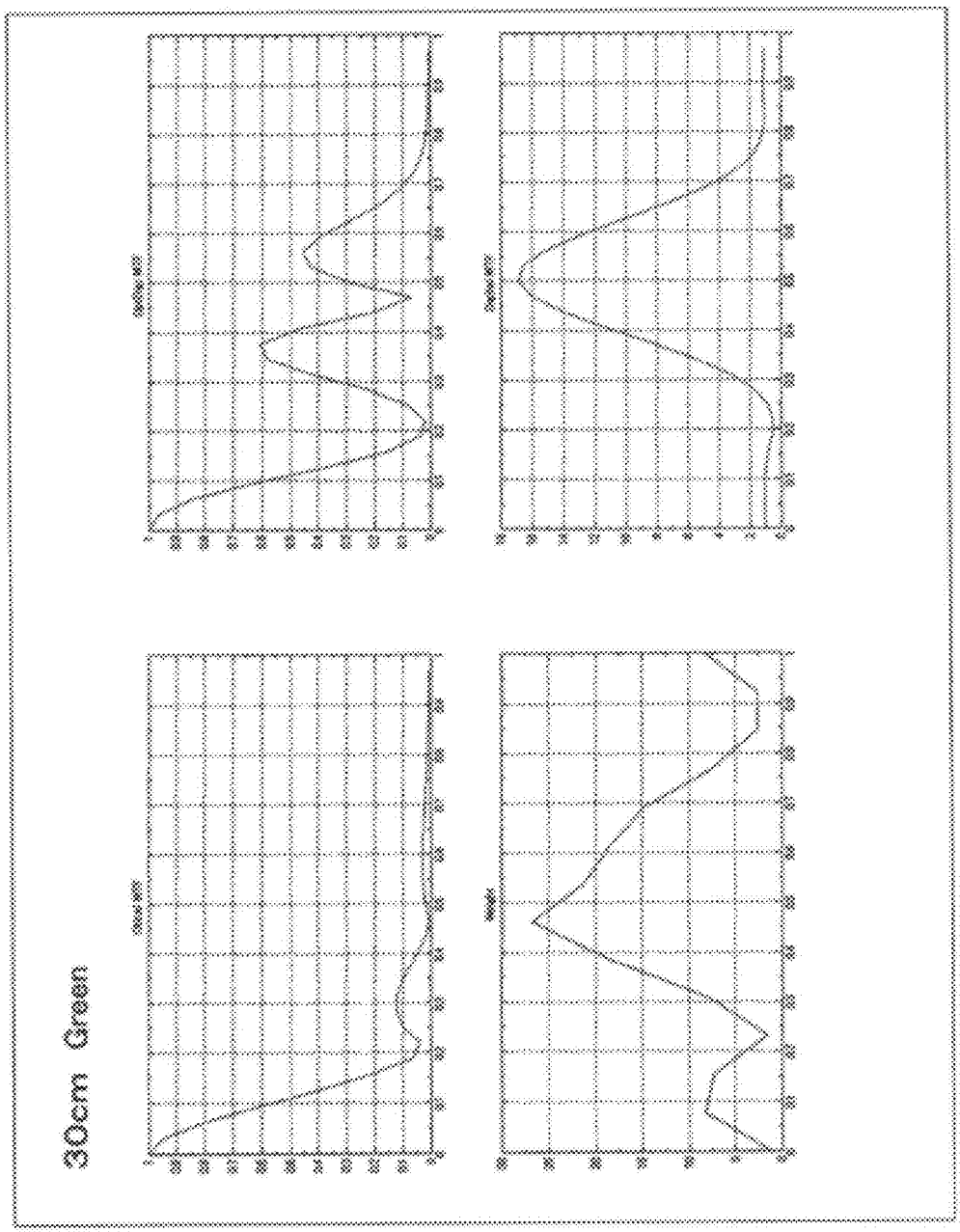
FIG. 6 is a diagram showing the result of G calculated from a distance-specific modulation transfer function (MTF) obtained from an EDOF lens and a corresponding EDOF (inverse function) coefficient.

FIG. 6 is a diagram showing the result of G calculated from a distance-specific modulation transfer function (MTF) obtained from an EDOF lens and a corresponding EDOF (inverse function) coefficient.

Figure 7:
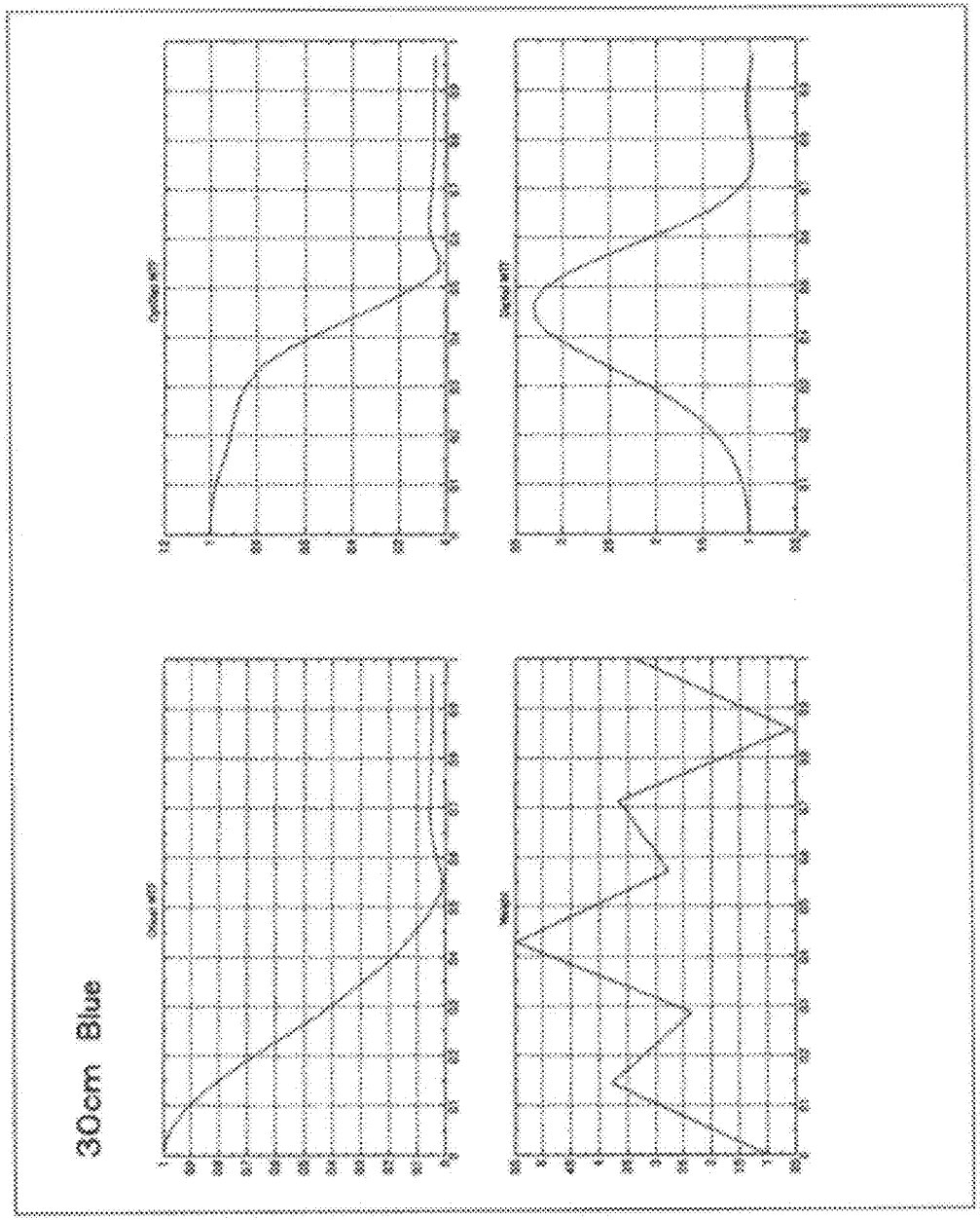
FIG. 7 is a diagram showing the result of B calculated from a distance-specific MTF obtained from an EDOF lens and a corresponding EDOF (inverse function) coefficient.

FIG. 7 is a diagram showing the result of B calculated from a distance-specific MTF obtained from an EDOF lens and a corresponding EDOF (inverse function) coefficient.

FIGS. 6 and 7 express the characteristics of signal processing of the EDOF with G and B as an example.

In FIGS. 6 and 7, the output characteristics are obtained by multiplying the lens characteristics and the EDOF filter characteristics.

As a result, a signal which has characteristics with no zero point may be used.

When acquiring an image of a QR code, blurring of the QR code is indicated at a zero point. There is no blurring in a region other than the zero point.

The higher the value of the maximum (MAX) frequency, the better.

In a normal sensor, only half of the resolution of B is qualitatively used.

In the case of G, about 70% can be qualitatively used. Meanwhile, when the condition for no zero point is 25 cm (the distance from the bar code to the lens), zero points are eliminated.

Under the current condition, there is a limit to 20 cm, and as a result, G is unable to be used. This is determined by a pixel pitch, an image contour, and a dot pitch of a bar code.

Accordingly, in this embodiment, B with little zero point is used.

Figure 8:
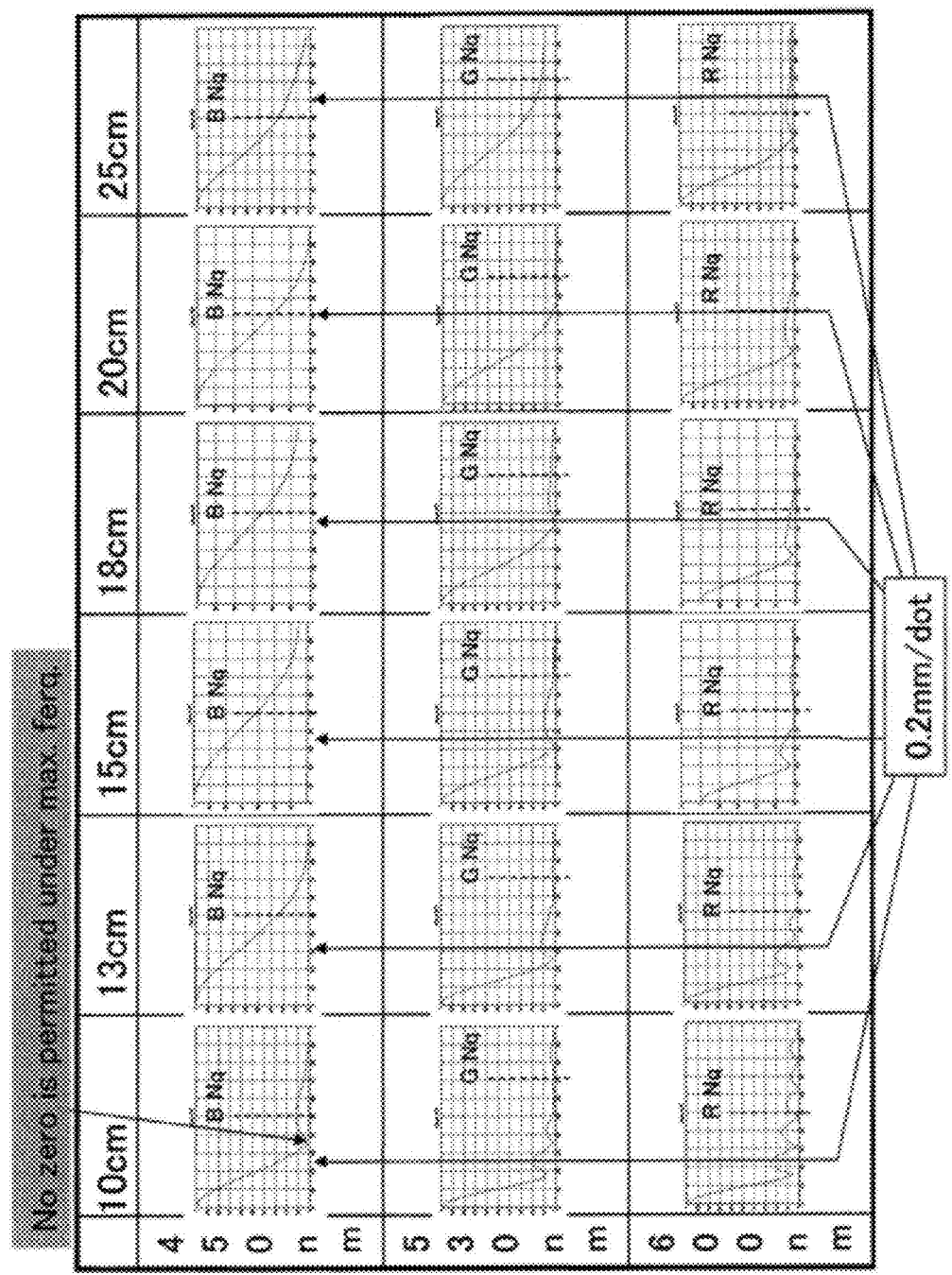
FIG. 8 is a diagram collectively showing, in a table, a maximum frequency calculated from dot size of a QR code.

FIG. 8 is a diagram collectively showing, in a table, a maximum frequency calculated from dot size of a QR code.

FIG. 9 is a diagram collectively showing, in a table, subject distance-specific and waveform-specific MTF data extracted from a lens example and frequencies when 0.2 mm/dot, 0.25 mm/dot, 0.3 mm/dot, and 0.4 mm/dot.

FIG. 8 is a diagram showing the Nyquist values of R, G, and B depending on the distance from the subject to the lens.

FIG. 8 is a diagram collectively showing, in a table, a maximum frequency indicated by an arrow in FIG. 9.

FIG. 9 collectively shows the result of FIG. 8 in a table.

As the distance from the subject to the lens, 10 cm, 13 cm, 15 cm, 18 cm, 20 cm, and 25 cm are used.

As will be understood from FIG. 8 and the like, when the distance from the subject to the lens is 10 cm, 13 cm, 15 cm, 18 cm, 20 cm, and 25 cm, and in particular, equal to or smaller than 20, the value of the maximum (MAX) frequency of the B signal is high.

Accordingly, as in this embodiment, a B (blue)-only process using normal lenses and a bar code and business card-dedicated EDOF process (CB EDOF) are performed, thereby reading a QR code or special information, such as a calling card, with high precision.

Figure 10:
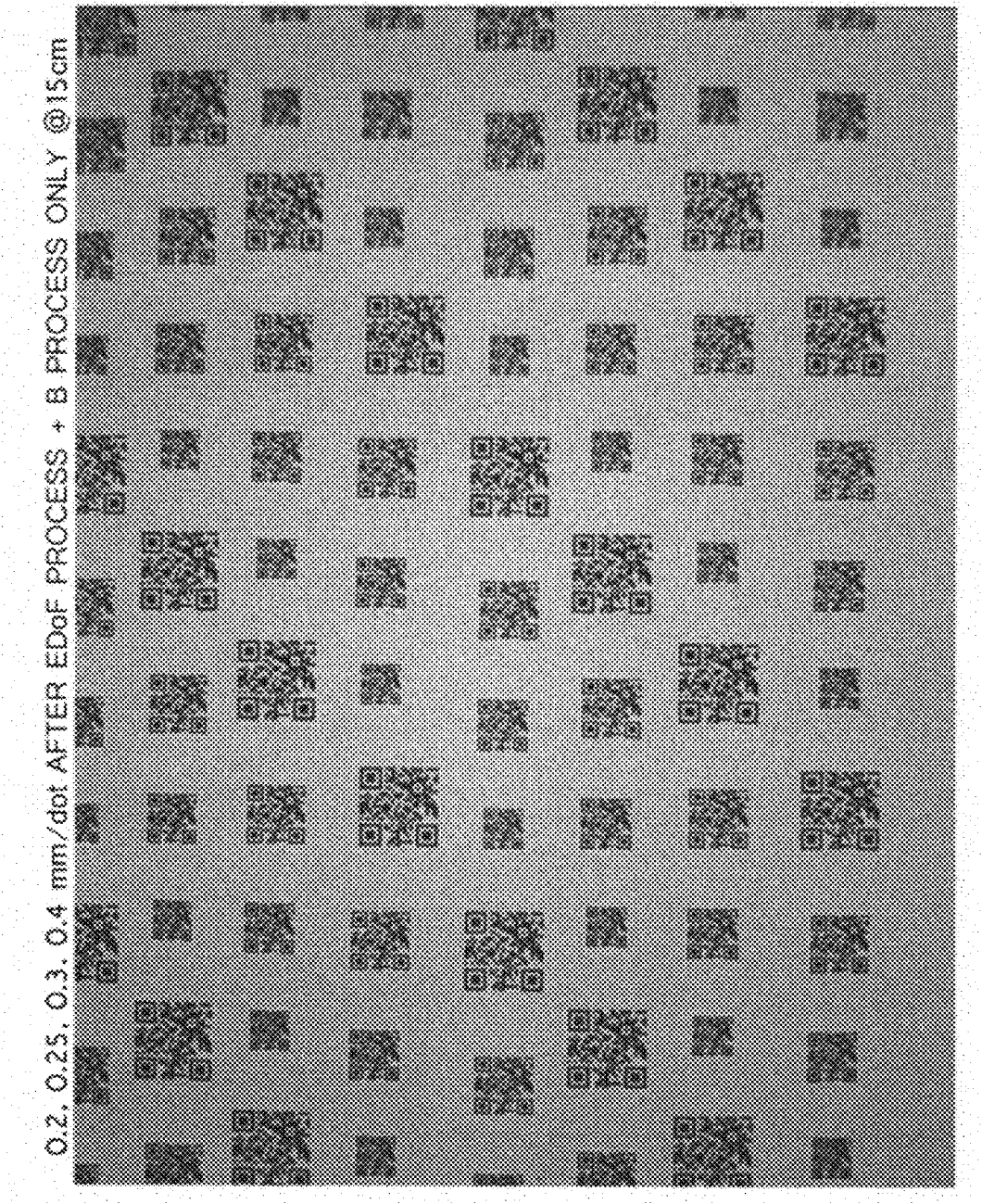
FIG. 10 is a diagram showing a processing result when a QR code is captured by an image capture device of this embodiment and B only is used.

FIG. 10 is a diagram showing a processing result when a QR code is captured by an image capture device of this embodiment and B only is used.

Figure 11:
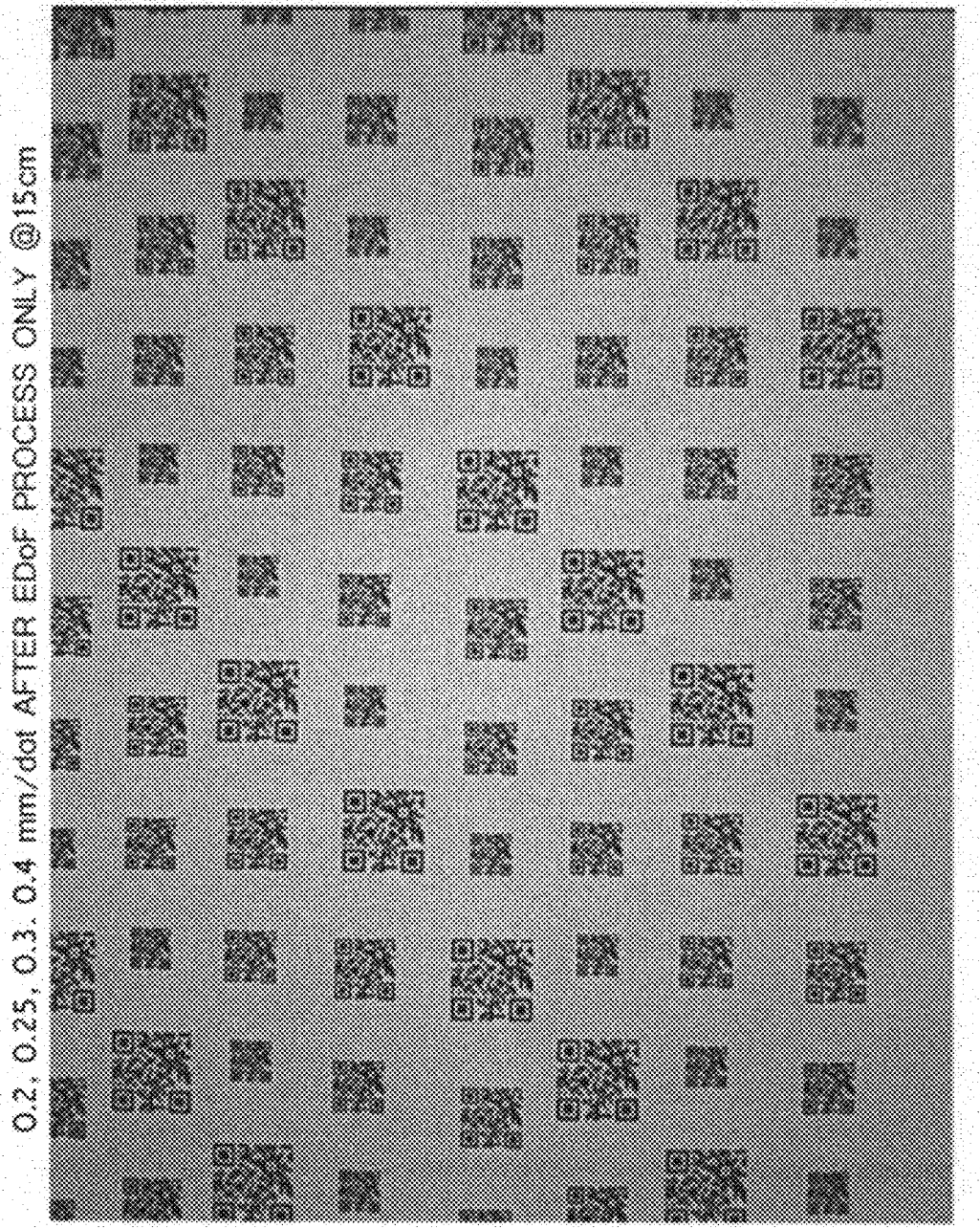
FIG. 11 is a diagram showing a processing result when a QR code is captured by a normal image capture device and R, G, and B are used as a comparative example.

FIG. 11 is a diagram showing a processing result when a QR code is captured by a normal image capture device and R, G, and B are used as a comparative example.

From FIGS. 10 and 11, it can be understood that the image capture device 10 of this embodiment can read a QR code or special information, such as a calling card, with high precision compared to a normal image capture device.

<3. Second Embodiment>
[Second Configuration Example of Image Signal Processing Circuit]

Figure 12:
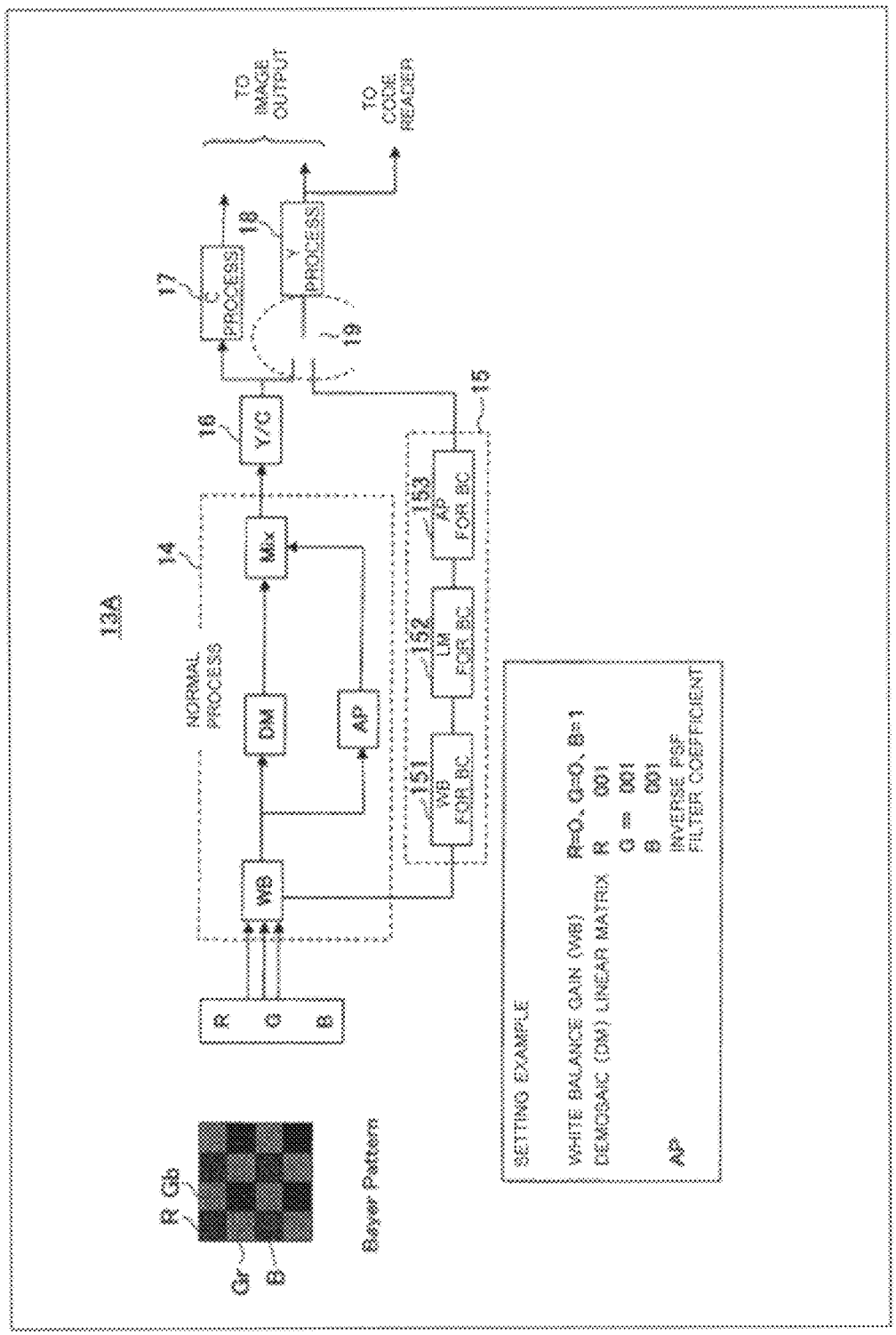
FIG. 12 is a block diagram showing a configuration example of an image signal processing circuit according to a second embodiment of the invention.

FIG. 12 is a block diagram showing a configuration example of an image signal processing circuit according to a second embodiment of the invention.

A difference between an image signal processing circuit 13A of the second embodiment and the image signal processing circuit 13 of the first embodiment is as follows.

The image signal processing circuit 13A of the second embodiment has a first signal processing unit 14 which obtains a color image using normal RGB image signals, and a second signal processing unit 15 which processes a QR code or special information, such as a calling card.

The first signal processing unit 14 has a normal white balance (WB) processing circuit 141, a demosaic (DM) linear matrix circuit 142, an aperture control (AP) processing unit 143, and a mixer 144.

The first signal processing unit 14 performs white balance processing, DM linear matrix processing, aperture control processing, and mixing using R, G, and B signals to obtain a color image.

A Y/C separation unit 16 is provided in the output stage of the first signal processing unit 14 to separate a luminance signal (Y) and a chroma signal (C).

A chroma processing unit 17 and a luminance processing unit 18 are disposed at the output of the Y/C separation unit 16.

A switch 19 is disposed in the input stage of the luminance processing unit 18 to select either the luminance signal of the first signal processing unit 14 or the output signal of the second signal processing unit 15 from the Y/C separation unit 16 and to input the selected signal to the luminance processing unit 18.

The second signal processing unit 15 has, for example, a WB processing circuit 151 for BC, a linear matrix circuit 152 for BC, and an aperture control processing unit 153 for BC which are dedicated for processing of a bar code (BC), such as a QR code.

In the second signal processing unit 15, as in the first embodiment, the WB processing circuit 151 performs processing using a signal of B only, and the linear matrix circuit 152 and the aperture control processing unit (AP) 153 similarly perform processing using a signal of B only.

As described above, in the image signal processing circuit 13A of the second embodiment, in addition to the first signal processing unit 14 which performs normal processing, the second signal processing unit 15 for a QR code is provided, thereby performing processing with higher precision.

The output of the image signal processing circuit 13 of the first embodiment becomes black and white.

Meanwhile, in the image signal processing circuit 13A of the second embodiment, while a color image is output, a chroma signal is subjected to normal processing so as to read a QR code or the like, and the Y signal is switched and replaced with a signal specialized for the B signal using the switch 19.

In this case, while the sampling rate is lowered, since the frequency component of optical information is high, a macro image is output sharply.

Accordingly, it is possible to produce an image in which a macro image is sufficiently developed.

Information, such as a bar code, can be realized using the Y signal.

The method that has been described above in detail may be implemented as a program based on the above-described procedure, and a computer, such as a CPU, may execute the program.

The program may be recorded on a recording medium, such as a semiconductor memory, a magnetic disk, an optical disc, or a Floppy (Registered Trademark) disk, and a computer in which the recording medium is set may access the recording medium and execute the program.

Reference Signs List
10: Image capture device
11: Lens system
12: Image capture element
13, 13A: Image signal processing circuit
131: White balance (WB) processing circuit
132: Demosaic (DM) linear matrix circuit
133: Aperture control (AP) processing unit
134: Mixer
14: First signal processing unit
15: Second signal processing unit
16: Y/C separation unit
17: Chroma processing unit
18: Luminance processing unit
19: Switch

The invention claimed is:

1. An image processing circuit for reading a QR code, comprising:
   a first signal processing unit including:
      a processing circuit which includes a white balance processing circuit and a linear matrix circuit and performs image processing using a one color signal having no zero point under a maximum frequency determined from a dot size of the QR code and having a resolution on a near point side from among a plurality of color signals; and
      an enhancement processing unit which includes an aperture control processing circuit which perform enhancement processing by applying an inverse function of a point spread function to the one color signal subjected to the image processing from the white balance processing circuit, wherein
      the white balance processing circuit performs white balance processing on the one color signal, and the linear matrix circuit performs linear conversion of color reproduction on the one color signal after the one color signal is subjected to the white balance processing.

2. The image processing signal circuit according to claim 1, wherein the first signal processing unit includes a mixer which mixes an output of the linear matrix circuit and an output of the enhancement processing unit.

3. The image signal processing circuit according to claim 1, further comprising:
   a second signal processing unit including:
      a white balance processing circuit that performs a white balance processing on the one color signal, and
      a linear matrix processing circuit that performs a linear conversion of color reproduction on the one color signal after the one color signal is subjected to the white balance processing, and
      an aperture control processing unit which applies the inverse function of a point spread function to the signal subjected to the white balance processing.

4. The image signal processing circuit according to claim 3, further comprising a switch which selectively extracts the output of the first signal processing unit and the output of the second signal processing unit.

5. The image signal processing circuit according to claim 1, wherein the one color signal is blue from among red, green, and blue which are three primary colors.

6. An image capture device, comprising:
   an image capture element;
   an optical system which guides incident light to the image capture element; and
   an image signal processing circuit which processes an output signal of the image capture element, wherein
   the image signal processing circuit for reading a QR code, includes:
      a first signal processing unit including:
         a processing circuit which includes a white balance processing circuit and a linear matrix circuit and performs image processing using a one color signal having no zero point under a maximum frequency determined from a dot size of the QR code and having a resolution on a near point side from among a plurality of color signals; and
         an enhancement processing unit which includes an aperture control processing circuit which performs enhancement processing by applying an inverse function of a point spread function to the one color signal subjected to the image processing from the white balance processing circuit, wherein
         the white balance processing circuit performs white balance processing on the one color signal, and the linear matrix circuit performs linear conversion of color reproduction on the one color signal after the one color signal is subjected to the white balance processing.

7. The image capture device, according to claim 6, wherein the processing circuit includes a mixer which mixes an output of the linear matrix circuit and an output of the enhancement processing unit.

8. The image capture device according to claim 6, further comprising:
   a second signal processing unit including:
      a white balance processing circuit that performs a white balance processing on the one color signal, and
      a linear matrix processing circuit that performs a linear conversion of color reproduction on the one color signal after the one color signal is subjected to the white balance processing, and
      an aperture control processing unit which applies the inverse function of a point spread function to the signal subjected to the white balance processing.

9. The image capture device according to claim 8, further comprising a switch which selectively extracts the output of the first signal processing unit and the output of the second signal processing unit.

10. The image capture device according to claim 6, wherein the one color signal is blue from among red, green, and blue which are three primary colors.

11. An image signal processing method for reading a QR code, comprising:
   a first signal processing method including:
      an image processing step of performing image processing using a one color signal having no zero point under a maximum frequency determined from a dot size of the QR code and having resolution on a near point side from among a plurality of color signals; and
      an enhancement processing step of performing enhancement processing by applying an inverse function of a point spread function to a signal subjected to the image processing using the one color signal from the processing step, wherein the processing circuit includes a white balance processing circuit that performs a white balance processing on the one color signal, and a linear matrix circuit that performs a linear conversion of color reproduction on the one color signal after the one color signal is subjected to the white balance processing.

12. A non-transitory computer readable medium storing program code for image signal processing being executable by a processor to perform operations for reading a QR code, comprising:

a first signal processing method including:

image processing which is performed using a one color signal having no zero point under a maximum frequency determined from a dot size of the QR code and having resolution on a near point side from among a plurality of color signals; and enhancement processing which is performed by applying an inverse function of a point spread function to a signal subjected to the image processing using the one color signal from the processing step, wherein the processing circuit includes a white balance processing circuit that performs a white balance processing on the one color signal, and a linear matrix circuit that performs a linear conversion of color reproduction on the one color signal after the one color signal is subjected to the white balance processing.

* * * * *